United States Patent [19]

Galajda

[11] 4,274,459
[45] Jun. 23, 1981

[54] TEMPLATE HOLDER AND TEMPLATES

[76] Inventor: John E. Galajda, 1161 Elaine Rd., Columbus, Ohio 43227

[21] Appl. No.: 77,615

[22] Filed: Sep. 21, 1979

[51] Int. Cl.³ .................... B27Q 35/04; B27C 5/10
[52] U.S. Cl. ...................... 144/144.5 R; 33/174 B; 144/144 R; 409/110
[58] Field of Search .......... 144/144 R, 144 S, 134 D, 144/136 C, 137, 27; 33/174 B, 174 G; 409/103, 110

[56] References Cited

U.S. PATENT DOCUMENTS

| 3,099,299 | 7/1963 | Gilfry | 144/144.5 |
|---|---|---|---|
| 3,584,385 | 6/1971 | Booth | 33/174 B |
| 3,789,892 | 2/1974 | Converse et al. | 144/27 |
| 3,860,050 | 1/1975 | Banks | 409/110 X |
| 4,095,633 | 6/1978 | Kimball et al. | 144/144 R |

Primary Examiner—W. Donald Bray
Attorney, Agent, or Firm—Robert E. Stebens

[57] ABSTRACT

A template holder and templates specifically designed for utilization with the holder are provided for use with woodworking devices to facilitate the forming of letters in producing nameplates and other sign structures. The template holder comprises one piece of plastic molded into the general configuration of a square having a peripheral rim, four exterior vertical sides each having a flange projecting from the lower edge, a recessed lip, including a magnetic strip located at the midpoint of the upper surface of the lip and bolt holes in the exterior sides and nail holes in the flanges to aid in attachment to the workpiece. A trapezoidal shaped metal template fits securely into the trapezoidal opening of the holder. The metal template is secured to the holder by the magnetic strips. The holder can be attached to the workpiece by nails, double sided adhesive tape, or by the use of an auxiliary bar attachment device. Each template features a different character and has an opening for the accommodation of a routing tool.

24 Claims, 11 Drawing Figures

| CHARACTER VERTICAL DIMENSION ||||||
|---|---|---|---|---|---|
| 6.35 CENTIMETERS / 2.5 INCHES ||||||
| CHARACTER LATERAL DIMENSION IN TEMPLATE ||||||
| 1.59 | 4.45 | 5.08 | 6.03 | 6.67 | CENTIMETERS |
| 5/8 | 1 3/4 | 2 | 2 3/8 | 2 5/8 | INCHES |
| I | B L 2<br>C O 3<br>D P 5<br>E R 6<br>F S 7<br>G U 8<br>H X 9<br>J Z 0<br>K | N<br>Q<br>T<br>V<br>Y<br>4<br>& | A<br>M | W | |
| 51 | 52 | 53 | 54 | 55 | REFERENCE LINE NUMERAL |

Fig. 11

TEMPLATE HOLDER AND TEMPLATES

BACKGROUND OF THE INVENTION

This invention is directed to the providing of a template holder and templates for utilization with woodworking devices such as the hand held routers. The templates are specifically designed for use with the template holder. The template holder and its templates are used essentially to facilitate forming of letters in producing nameplates and other similar type of sign structures.

Several types of template holders and templates are known for use in conjunction with woodworking devices, however, practical considerations limit their effectiveness. The general concept of a template holder is shown in the Converse et al, U.S. Pat. No. 3,789,892. That patent discloses a multiple component template holder which, when assembled, clamps a piece of wood into the holder for routing. This clamping feature is also shown in a much more complicated apparatus for templates in Banks, U.S. Pat. No. 3,860,050. Although the clamping does restrict the movement of the wood or other material being worked on, it also increases size and complexity with a consequent increase in cost. A disadvantage of both Banks and Converse is that the respective disclosed structures can only accommodate a certain size of workpiece. If the workpiece is too large for the clamp to fit around, or the location on the workpiece is such that the holder cannot be properly positioned, then the existing template holders are useless. A second disadvantage of the template holders heretofore provided is that they require some assembly procedure before use. This may be as in Converse, which requires the various components of the template holder to be assembled or, as in Banks, which requires assembly of the template before the routing process can be commenced. Furthermore, as can most easily be seen from an apparatus such as Banks, the cost of the template holder could prove to be prohibitive for many artisans desiring accurate routing, but are only doing so on the basis of enjoying woodworking as a hobby.

Additionally, use of the heretofore available templates mentioned above is time consuming. For each new engraving, the holder must be disassembled and then reassembled, as in the case of Converse, or the template itself must be assembled as in Banks. Therefore, much of the time spent on the routing project is really wasted on the preparation for the routing. Attempts have been made to hasten the process, as in Banks, which employs a guide path to aid the workpiece in its horizontal movement in the apparatus and thus permit a faster operation. Still, even with such developments, the existing template holers require a substantial amount of time to be expended to accomplish the job.

SUMMARY OF THE INVENTION

In accordance with this invention, a template holder and templates which are specifically designed for utilization with the holder are provided for advantageous use with woodworking devices to facilitate the forming of letters in producing nameplates and other similar types of sign structures. The template holder and templates may be utilized with any dimension workpiece surface provided the workpiece has a sufficient width or surface area on which the template may be positioned. The template holder can be easily moved across the face of the workpiece to permit lettering in either a horizontal or vertical direction.

The template holder may be advantageously formed from suitable plastic material compositions by appropriate molding procedures and may be formed as a single unitary structure. The template holder comprises a structurally rigid frame with a peripheral rim supported by four elongated flanges. Each flange has marks or indicia located on their upper surface and similar indicia are also located on the upper surface of the holder along the rim thereof. These indicia function in cooperation with respective templates that are to be supported on the frame to facilitate spacing. On each flange of the holder are two or more small holes to potentially aid in attaching the holder to the workpiece, such as by nails. Located centrally of the peripheral rim is a recessed lip which accommodates the individual templates. Located along the midpoints of the sides of the lip are magnetic tape strips or magnets to aid in the securing of templates made from metal to the holder during routing operations.

The templates are preferably made from metal to permit utilization of the magnetic attachment, but they could also be made from plastic and either utilize metal inserts or other types of attachment or securing means. The shape of each template is trapezoidal, as is the periphery of the recessed lip on which it is positioned to obtain proper orientation. Each template has one character therein and thus, to obtain a complete alphabet, 26 templates are needed to provide for a single size of letter with additional templates required for numbers or other characters. Two different size alphabets (or numbers) may be provided of either upper or lower case, or relatively larger and smaller character size, and even additional size template sets can be provided with appropriate consideration of the indicia that is necessary to assure proper spacing of characters in each particular size set. To avoid potential confusion as to which type size is being used, the base of the larger size letters is along the wide base side of the trapezoid, while the base of the smaller size letters is along the narrow base side of the trapezoid. This feature is also useful where there is a distinction in letter or character size as between different template sets. Also, a color code or other type of size identifying indicia may be utilized to distinguish respective template sets.

The various indicia marks formed on the template holder's rim and flanges and on the templates themselves enable the apparatus to be accurately positioned in locating the letters in forming a word. The central indicia marks on the sides of the template holder are used to maintain alignment with a center line for the shifting of the template and holder in the progressive formation of a group of selected characters or letters on a predetermined line on the workpiece. There are several different letter widths in each letter size that must be provided for in determining spacing. The several indicia marks along the upper and lower rim, flanges of the holder, and on the templates, serve to provide specific indication of letter spacing with regard to those various letter widths in a given letter size.

A clamp-bar device is also provided to be used in conjunction with the template holder and templates positioning the holder on a workpiece surface. This device avoids having to drive the small nails into a surface such as plastic which would show the marks of the nail holes. Two clamps are provided in the illustrative embodiment to attach the template holder's guide arms to a guide rod mounted in fixed relationship to the workpiece. The guide arms may be fastened to the template holder either by bolts or other suitable fastening means. The use of the clamp bar device would always keep the templates positioned along a selected guide or center line as the holder is sequentially moved from one character position to the next. Other clamp structures may be devised and utilized to achieve the same functional objective.

An important objective of this invention is to provide a template holder and templates for use with any size workpiece having a sufficient width or surface on which the template holder may be positioned.

Another objective of this invention is to provide a simply constructed, yet efficient, template holder and templates for use with routers.

Still another objective is to provide a template holder and templates which cooperate to provide an accurate predetermined spacing between the individual letters (or characters) regardless of the specific spacing in a particular size template set.

Another objective of this invention is to provide a template holder and templates which are conveniently easy to use.

These and other objects and advantages of this invention will be readily apparent from the following detailed description of an illustrative embodiment thereof. Reference will be had to the accompanying drawings which illustrate embodiments of the invention.

DESCRIPTION OF THE ILLUSTRATIVE EMBODIMENTS

Figure 1:
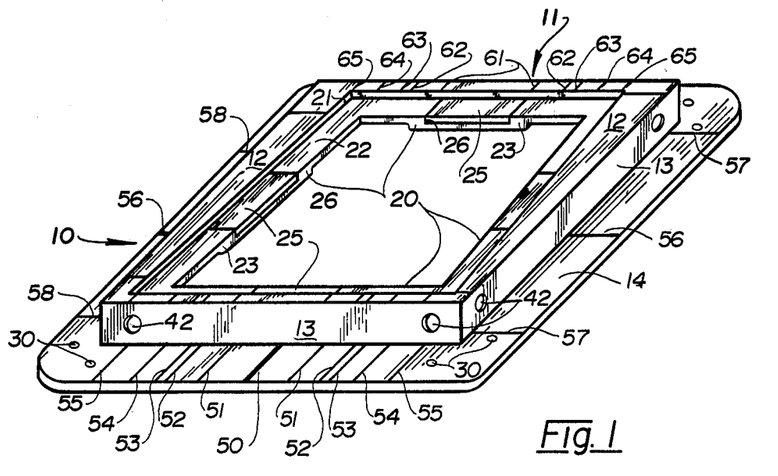
FIG. 1 is a perspective view of a template holder embodying this invention.
Figure 2:
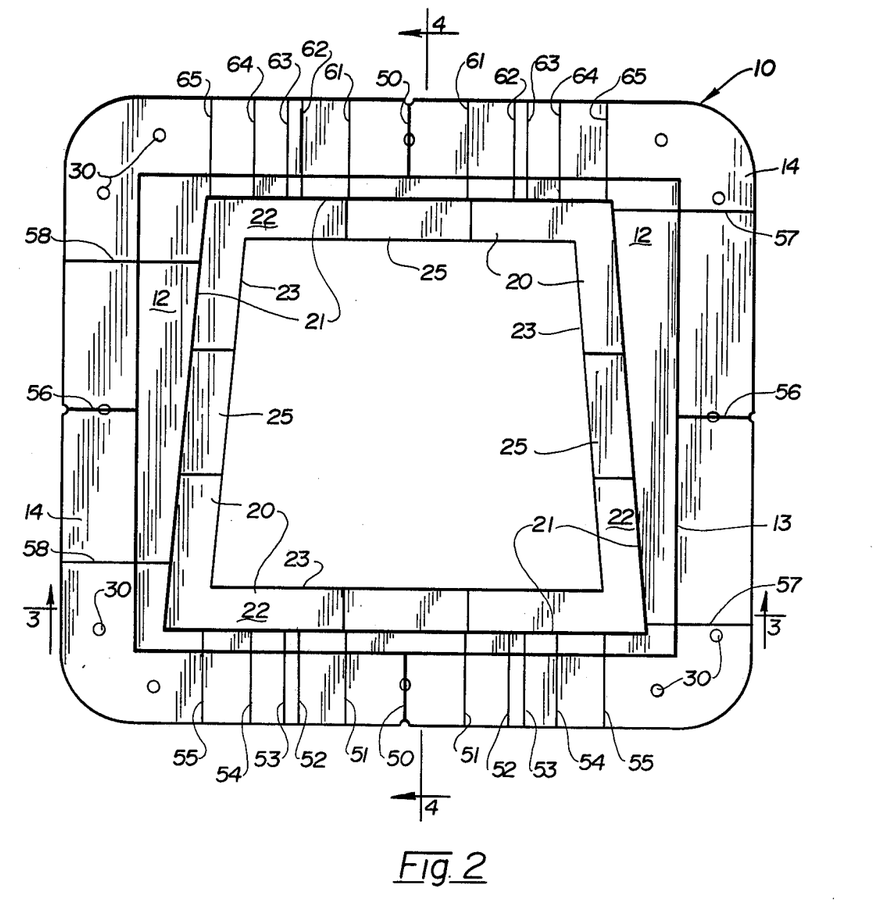
FIG. 2 is a top plan view of the template holder.

Having reference to the drawings, attention is directed to FIGS. 1 and 2 which illustrate a template holder designated generally by the numeral 10 and embodying this invention. The template holder is used in combination with one or more sets of templates (shown in other figures of the drawings and further described) and with appropriate material working devices such as woodworking routers (not shown) to facilitate forming of characters (letters and numbers) in a selected workpiece. Production of nameplates and sign structures is one example of utilization. While wodworking is a primary area of utilization, it will be understood that other materials may be worked with appropriate tools using the template holder and selected template sets of this invention.

The illustrative embodiment of the template holder 10 comprises a peripheral rim 11 having upper coplanar surfaces 12 supported in spaced relationship to a workpiece surface (not shown). These surfaces 12, in conjunction with the respective templates to be supported by the holder, form a composite surface for support of a work tool which is to be utilized therewith in forming of the character, alphabet or number indicia as will be further described. Supporting the peripheral rim 11 in spaced relationship to a workpiece surface are respective upright sidewalls 13 which carry the rim at their upper edges and cooperatively define a rectangularly-shaped structure. The vertical height of the sidewalls 13 is related to the size or type of work tool with which the device will be used. The peripheral rim 11 must be supported at an elevation to the workpiece surface to enable proper operation of the tool as well as accommodate the chips that are removed during the work operation. Also, included in the general basic template holder of this invention are respective horizontally extending flanges 14 which are formed at the bottom edges of the sidewalls 13. These flanges project a predetermined distance laterally outward from the sidewalls and have a primary function of carrying certain indicia for facilitating and effecting proper spacing and alignment of the holder. A secondary function of the flanges is to provide greater stability for the holder and, in certain modes of utilization, facilitating securing or retention of the holder in or at a specific designated work position. Preferably, the respective flanges 14 are interconnected at adjacent corners to provide a continuous peripheral flange for improvement of structural strength and enhancement of the holder's appearance. The template holder is preferably formed of molded plastic and can be readily fabricated as a unitary structure. Metallic material may also be used in casting or molding the holder. Alternatively, it is conceivable that a built-up structure fabricated from metals or other suitable materials would be practical and feasible.

Figure 5:
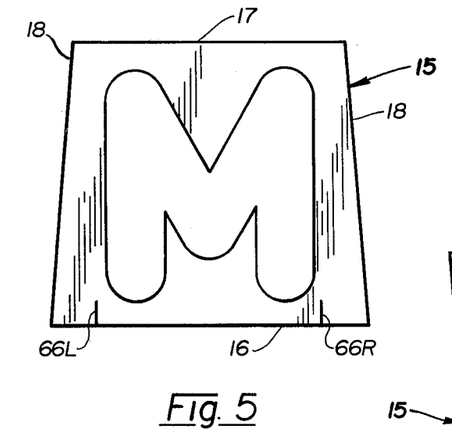
FIG. 5 is a top plan view of a template having a first size character.
Figure 6:
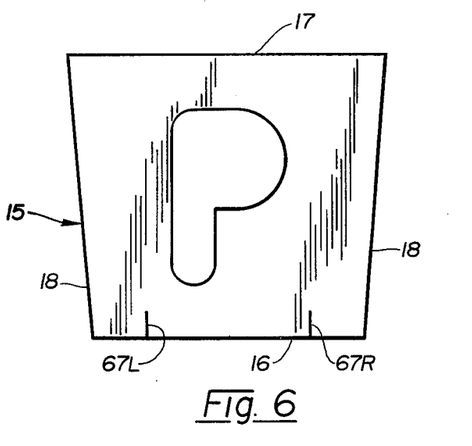
FIG. 6 is a top plan view of a template having a second size character.

The templates designated generally by the numeral 15 to be utilized with this holder are relatively thin, sheetform plates with exemplary types being shown in FIGS. 5 and 6. Each template in a set is of the same thickness and has a peripheral configuration in the form of a trapezoid to facilitate orientation with the holder. For the specific illustrated set having a particular size character, the base edge 16 of the trapezoid is at the bottom of the character. For a second size character set, preferably relatively smaller, the characters would be oriented so that their bases would be adjacent the short base or top edge 17 of the trapezoid. Reference to FIGS. 5 and 6 illustrates this distinctive arrangement where a character letter M is shown oriented to the base edge 16 in FIG. 5 and a smaller size character letter P is shown oriented to the top edge 17. Extending between the base and top edges are the two side edges 18 which are angularly oriented to the base and top edges. This arrangement or orientation of characters is of particular benefit if there are more than one set of characters available for use, but is not as significant if there is only one set that will be utilized. This opposite orientation is of benefit primarily where the difference in size as between two character sets is not great as it assures that templates from two closely sized sets will not be inadvertently intermixed and result in a serious and generally irreparable error in the work. It will be understood that appropriate identifying indicia, such as color, may be applied to each template of a set to aid in avoiding such error and it will be further understood that template sets having a relatively large difference in character size will be better and more easily visually distinguished.

Materials used in fabrication of the templates may be selected from available metals, plastics and fiber particle compositions such as masonite. The thickness of the template depends on the material selected which, in the case of masonite or a suitable acrylic or polycarbonate plastic, may be of the order of 3–4 millimeters (⅛ inch) and 1–2 millimeters for steel or aluminum. Each material that may be selected will be utilized in a thickness which will provide the necessary structural rigidity for the size of the template taking into account the forces encountered in guiding of the work tool, such as a router, and its support in movement over the template. With respect to a router, such a tool is generally provided with a cylindrical bushing that projects vertically downward. It is this bushing which projects through the cut out area of the template, which areas define the respective character to be formed, and this bushing is guided along with and in contacting engagement with the peripheral edge of the cut out area. A selected router tool has its mounting shank extending through the bushing; thus, no rotating work tool element comes into contact with the template.

Figure 3:
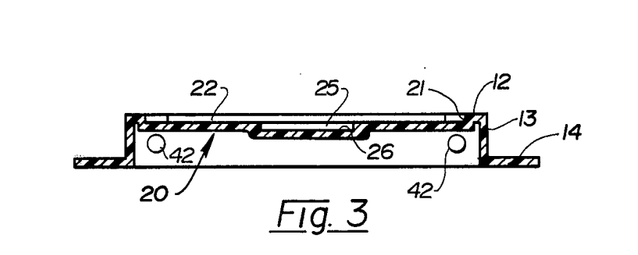
FIG. 3 is a vertical sectional view taken along line 3—3 of FIG. 2.
Figure 4:
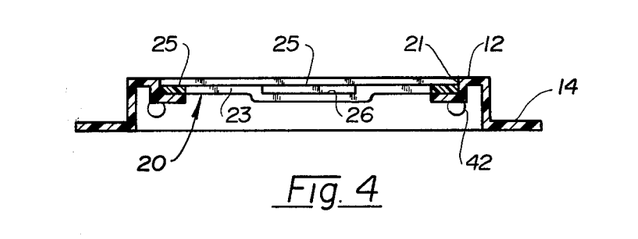
FIG. 4 is a vertical sectional view taken along line 4—4 of FIG. 2.

Integrally formed with the peripheral rim 11 of the template holder 10 is a template supporting flange 20. This flange 20 projects relatively inward of an inner edge 21 of the rim as can be best seen in FIG. 1 and is also recessed relatively downward with respect to the upper surface 12 of the rim. Thus, the flange 20 has an upper template engaging surface 22 which is spaced a distance below the peripheral rim surface 12 that is substantially equal to the thickness of the particular templates with which the holder is to be utilized. This results in the upper surface of the templates forming a coplanar continuation of the rim surface 12, thereby avoiding interference with the smooth unhindered movement of the work tool or router over the assembled holder and template. It will be noted that the inner edge 21 of the rim is also of a trapezoidal configuration to cooperatively receive the templates of a similar configuration and is sized to restrain the template against lateral shifting movement. The support flanges 20 are of uniform width and thus, have an inner edge 23 which is also of trapezoidal configuration. FIGS. 3 and 4 are transverse vertical sectional views of th holder 10 and further illustrate its configuration. Although a trapezoidal configuration for the templates and their associated supports of the holder is illustrated, it will be understood that a rectangular or other configuration may be utilized. However, it is preferred that a size designating indicia as well as orientation indicia be provided to avoid error.

While it is not essential that means be provided for securing of a template in the holder, it is preferred and advantageous to do so. For example, utilization of the device on a vertical surface requires positive securing of the templates in the holder and it is advantageous to do so on a horizontal workpiece to prevent the inadvertent displacement of a template which may be hazardous and as well as possibly resulting in irreparable damage to the workpiece. Providing of securing means with a plastic template holder 10 and ferromagnetic metal templates can be readily accomplished by use of magnets. In the illustrative embodiment, the template holder 10 is provided with four magnet devices 25 which may be in the form of flexible plastic strips. Each of the four magnet strips is secured, as by a suitable adhesive, in a recess 26 formed in a respective supporting flange 20 at approximately the midpoint thereof. Each magnet strip is recessed to have its upper surface coplanar with the template supporting surface 22 of the flange, thereby resulting in a smooth and continuous surface for support of a template. If necessary, as a consequence of generally uniform thickness of the holder structure and the necessity to maintain structural integrity of the holder, the thickness of the template flange 20 may be increased in the region of the magnetic strip recess 26 as shown in FIGS. 1, 3 and 4. Alternatively, but not shown, the magnetic devices may be conventional magnets and secured in a recess by an adhesive or they may be embedded in the plastic through direct molding.

It is particularly advantageous to secure the template holder 10 on a workpiece in a selected position during the forming of the template character by a router or other work tool. Secure fixing of the holder on a horizontal surface assures accurate forming of the characters with securing being required on vertical workpiece surfaces. One convenient securing technique that is particularly adapted to wood workpieces is the use of small nails. For this purpose, each indicia flange 14 is provided with a pair of spaced apart apertures 30 which are of a diameter to permit passage therethrough of relatively small nails (not shown) into an underlying workpiece. These nails need not be driven completely into the workpiece and, by using small nails, they may be easily removed and will not leave any significantly visible mark that cannot be taken care of by appropriate finishing procedures. Care must be taken to assure that the nails will not project into the path of the router.

Alternatively, the template holder 10 may be adequately secured to a workpiece surface by means of releasable adhesive tapes in the event that the workpiece would be unacceptably marred by the use of nails. This would be the case with a workpiece having a prefinished surface or provided with a plastic composition veneer such as Formica. For example, although not shown, a double faced adhesive tape may be utilized with the tape being selected to have a relatively stronger adhesive on one side for securing to the bottom surfaces of the indicia flanges 14. The holder may then be quickly positioned on the workpiece and may be readily removed and repositioned at another location.

Figure 7:
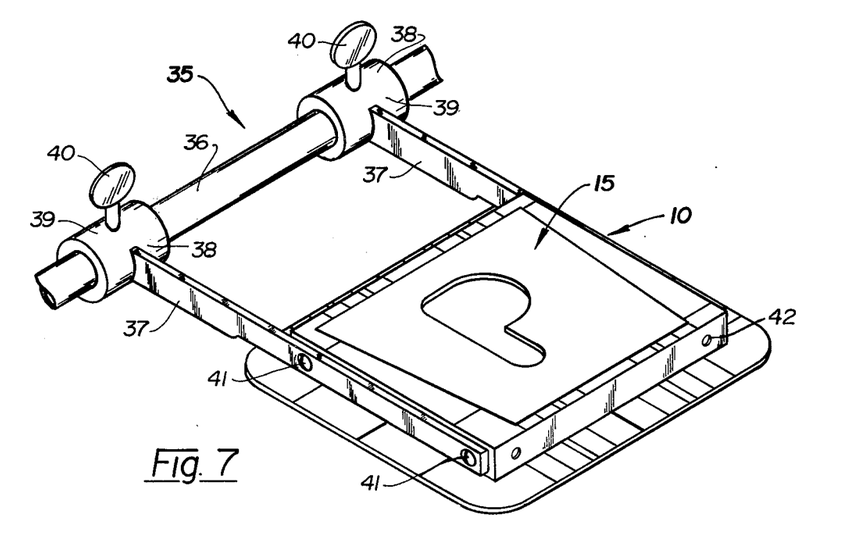
FIG. 7 is a perspective view of the template holder and an auxiliary bar attachment device.

An auxiliary holding apparatus for securing of the holder 10 in a desired position, but readily permitting its movement in accordance with the technique of utilization, is shown in FIG. 7. This auxiliary apparatus designated generally by the numeral 35 is adapted for use in conjunction with a pipe-type clamping device such as that which is commonly used in woodworking shops. The pipe-type clamping device is not shown in its entirety as the structure is well-known and only a fragmentary portion of the pipe 36 is shown. Included in the auxiliary holding apparatus 35 are a pair of elongated arms 37 which are provided at one end with attachment means for securing of the arms to the pipe 36 at selected position. In this embodiment, each arm 37 is provided with its own mounting clamp 38 comprising a cylindrical tube 39 positionable on the pipe 36 and axially slidable therealong to a desired position. Each tube 39 has a thumb screw 40 threaded into the wall thereof and operable to effect clamping of the unit to the pipe.

The opposite ends of the arms 37 are adapted to be secured to the sidewalls 13 of the template holder and in this illustrative embodiment, this is accomplished by bolt type fastening devices 41. For this purpose, pairs of apertures 42 are formed in each sidewall 13 of the template holder (see FIG. 1) in relatively spaced relationship. Similarly spaced apertures are formed in each of the arms 37 which can thus be removably secured to the holder. Bolt receiving apertures are formed in all sidewalls of the template holder to permit mounting in either of two positions that are oriented in 90 degree angular relationship. The purpose of this selective orientation is to enable the device to be utilized in forming of characters along an axis that is either parallel to a base of the characters or perpendicular thereto. This functional operation will be more readily understood with the subsequent detailed description of operation. While the elongated arms 37 are illustrated as being removably attachable to the template holder 10 by bolts, it will be understood that other suitable fastening means may be utilized or that the arms may be permanently secured.

Utilization of the template holder 10 and the respective templates 15 provided by this invention is effectively enhanced in versatility and ease of use by the capability of the device to accurately determine the preferred spacing of the various characters in either an alphabet or in a set of numbers. It is well-known that, in a particular size template set, there is a substantial difference in relative widths of the respective letters or numbers as well as other characters that may be desired. This difference in width and consequent difference in spacing requirements is tabulated in FIG. 11 for an alphabet and number set having a height of 6.35 centimeters (2½ inches). Five widths are considered sufficient to obtain the desired proportional spacing, although this can be reduced by restyling the letter W to fit within the letter M width and further reduced by restyling both the letters M and W to fit with the letter N spacing. This lateral or transverse spacing presents a problem in accurate and properly portion of characters whereas vertical spacing does not present such problem as all characters in a set are of the same height.

In order to achieve the proper proportional spacing of the characters laterally to each other, the template holder 10, and also preferably the templates are formed, are provided with width or lateral space indicating indicia. The holder is provided with indicia in the form of a center reference line 50 and five space reference lines 51, 52, 53, 54 and 55 located at either side of the center reference line 50 on the flange 14 at the base side. These same space reference lines are preferably repeated on the upper surface 12 of the peripheral rim 11. These reference lines may be formed on the respective surface by printing or they may be molded or engraved into the surfaces. Each of the two side indicia flanges is also provided with a center reference line 56 which is aligned with the horizontal geometric axis of the template opening whereas the first noted center reference line 50 is aligned with the vertical geometric axis. It will be noted that a counterpart center reference line 50 is formed on the top indicia flange.

The opposite side indicia flanges are also provided with respective pairs of vertical spacing reference lines 57 and 58 with those lines repeated on the associated portions of the peripheral rim. The reference lines 57 on the right side are of a relatively greater spacing than those on the left, and in accordance with the difference in vertical height as between two different size sets of characters. The lines 57 on the right indicia flange are for a large character such as that illustrated in FIG. 5 whereas the reference lines 58 on the left indicia flange are for a relatively smaller character such as that illustrated in FIG. 6.

Figure 11:
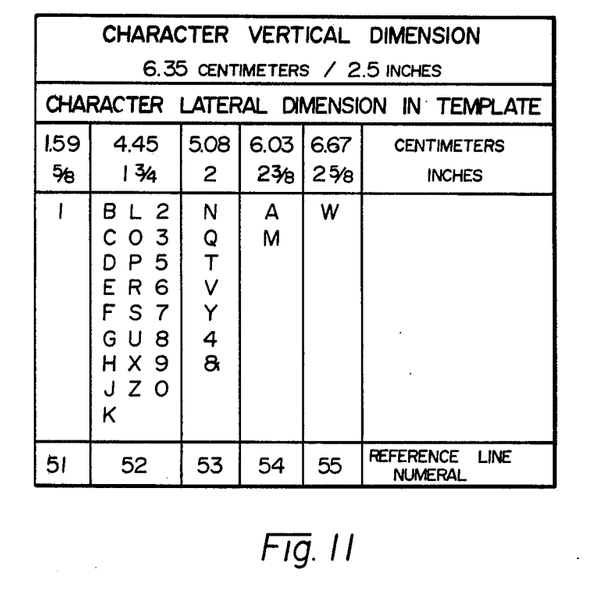
FIG. 11 is a table showing character size relationships.

The illustrated template holder is designed for use with two different size template sets and the indicia flange at the top is thus provided with two sets of five reference lines 61, 62, 63, 64 and 65 arranged at opposite sides of the center reference line 50. While this flange is referred to as the top, it will be understood that it is the bottom when the holder is being used with the smaller template set. It will also be noted that the tabulation of FIG. 11 is only appropriate for the larger characters.

Each of the templates in a particular size set are provided with pairs of reference lines which are spaced apart in accordance with the lateral space requirements of the particular character. Thus, the template 15 for the letter M shown in FIG. 5 has two reference lines 66 L and R on the surface thereof along the base edge. These reference lines are equidistantly spaced from a center line extending vertically through a geometric center of the template. Other templates with characters requiring different lateral spacing would have similar pairs of reference lines proportionally spaced along the edge.

The templates of the smaller character set as shown in FIG. 6 are also provided with similar lateral spacing reference lines along a respective base edge. The illustrated letter P template is thus shown as having the two reference lines 67L and 67R.

Figure 8:
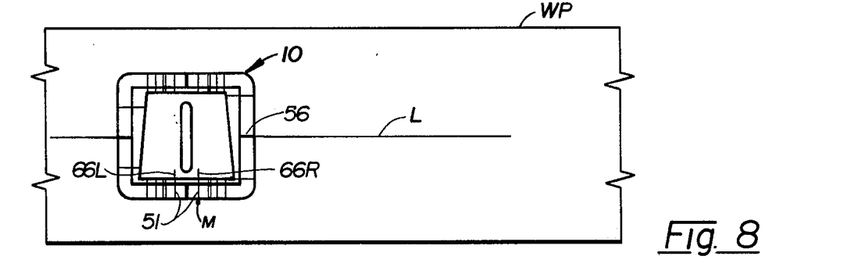
FIGS. 8, 9 and 10 are diagrammatic illustrations of the utilization of the template holder and templates in forming a series of letters.
Figure 9:
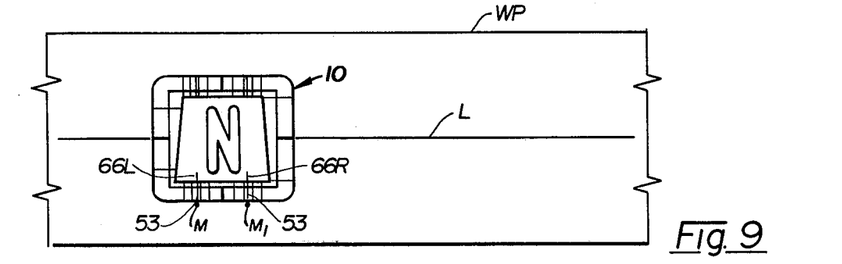
Figure 10:
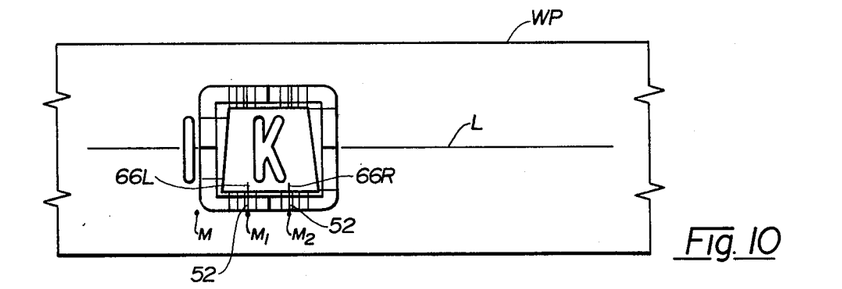

FIGS. 8, 9 and 10 illustrate the sequential steps in the method for utilizing the invention to facilitate the forming of letters in producing nameplates and other similar type of sign structures. For horizontal lettering, the first thing necessary is the drawing of the center or guide line L on the workpiece WP to enable the lettering to be done along a predetermined line. The template holder 10 is then positioned where desired along the workpiece WP such that the center reference line 56 on each of the side indicia flanges 14 are located directly on the guide line L. The holder can then be secured by any of the previously described techniques such as nails through nail holes 30, or by double faced adhesive tape placed beneath the flanges 14. A template 15 is placed in the holder, for example, in FIG. 8 an upper case template 15 with the letter "I" is shown. The space reference lines 66 of the template are thus located adjacent to a respective pair of reference lines 51 on the peripheral rim 11 and base indicia flange 14. A first index reference mark M associated with the right hand reference line 51 is made on the workpiece surface to assist in the horizontal spacing between "I" and the next letter. The routing of the letter "I" is then done. When the routing is finished, the template is removed from the holder and the holder is then ready to accommodate another template.

In FIG. 9, the template holder has been shifted longitudinally along the guide line L, such that the center reference lines 56 are again located on the guide line L. A second template 15 is selected and positioned in the holder as in FIG. 9 with the letter "N" shown. The left space reference line 66L for this template is now seen located adjacent to the reference lines 53 on the indicia flange and the holder is laterally positioned to align that reference line with the reference mark M. The holder is then secured, if desired, to the workpiece by appropriate means. A second index reference mark M1 is then made on the workpiece adjacent to the right space reference line 53. The routing of the letter "N" is then done. When the routing is finished, the template is removed from the holder and the holder is then ready to accommodate another template.

In FIG. 10, the template holder has again been shifted longitudinally along guide line L such that the center line indicia 56 are located on it once again. The routed letter "I" is seen to the left of the holder. Another template 15 with the letter "K" is then positioned in the holder. The holder is then adjusted so that left space reference line 52 is located adjacent to the reference mark M1. Another reference mark M2 is then made on the workpiece adjacent to the right space reference line 62. The holder is then secured to the workpiece WP, if desired, and the routing of the letter "K" is done.

Figure 10A:
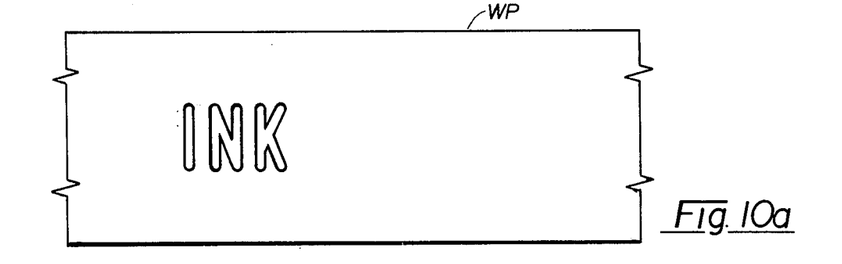
FIG. 10a is similar to FIG. 10, but having the template holder removed to show the complete word.

The procedure can then be repeated for additional characters that are to be included in a specific sign. Lateral spacing of the characters in accordance with their desired proportional spacing is readily and accurately achieved by use of the reference lines on the templates 15 which indicate the pairs of reference lines to be used on the indicia flange 14. These reference lines on the templates 15 and flange 14 are located with reference to the particular character on the template such that one-half of the space required between adjacent characters is provided by the left side reference lines and another half is provided by the right side reference lines. The result is shown in FIG. 10a wherein the template holder has been removed from the workpiece and the three letters INK are seen to be uniformly and properly spaced.

Use of the template holder with a template set of smaller sized characters is similar to the previously described procedure except that the holder would be inverted so that the smaller dimension of the trapezoid would be considered the base. The templates of that set would then be used in the same manner with the template reference lines 67 L and R then designating the respective ones of the reference lines 61-65 which are to be utilized in determining the spacing.

The template holder and templates of this invention may also be utilized in forming of signs that are vertically oriented. Correct spacing of the characters is accomplished by means of the reference lines 57 or 58 provided on the side indicia flanges of the holder in accordance with whether the large or small character template set is selected. In either instance, assuming that the first character is to be formed at the top of a sequence, the holder is positioned on a workpiece having a vertical guide line scribed thereon with the center reference line 50 in alignment and a reference mark made on the workpiece at the lower of the two reference lines 57 or 58. Upon completion of forming that character, the holder is provided with another template, moved downwardly with the center reference line 50 aligned with the scribed guide line and the upper reference line 57 or 58 aligned with the last reference mark made on the workpiece. The character is then formed and this sequence repeated with a second reference mark being formed on the workpiece at the lower of the two reference marks 57 or 58 prior to moving the holder or changing the template.

Utilization of the template holder 10 with the auxiliary holding apparatus 35 is essentially the same as described except that it is not necessary to scribe a guide line on the workpiece. The pipe 36 performs the functions of a guide line and it is only necessary to sequentially move the template holder in accordance with reference marks that are placed on the workpiece. The template holder would be secured to the elongated arms in an orientation which would enable either of a selected size of templates or to proceed in forming of the characters along either a horizontal line or a vertical line (or an inclined line).

Additionally, this invention possesses many safety features to reduce the number and severity of injuries associated with routing and templates. First, the invention provides for securing of the holder to the workpiece. Several nail holes 30, a sufficiently wide flange 14 to accommodate double sided adhesive tape, and a clamping device assuring adequate attachment is provided for a variety of workpiece materials. Secondly, the magnetic strips 25 assure that the template will remain firmly positioned in the holder during the routing process. Finally, the problem of thrown wood chips which, acting as projectiles, could cause blindness or other injury such as disfigurement, is eliminated since a substantially large volume is provided in the interior of the enclosed holder. The closed sides of the holder prevent the router from throwing the wood chips into the work place, thereby eliminating the possibility of injury from that type of accident.

It will be readily apparent from the foregoing detailed description of illustrative embodiments of this invention, that a particularly novel and extremely effective template holder and template specifically designed for utilization with the holder are provided. This template holder and template are relatively simple to fabricate and require a minimal amount of time to assemble to conduct the routing. The structure, utilizing preferably metal templates and a plastic holder, is economical to fabricate and results in an effective method to form letters in producing nameplates and other similar type of sign structures. The structure is particularly adapted to accurately space the characters in a desired proportional relationship.

Having thus described this invention, what is claimed is:

1. A template apparatus for use in guiding of a work tool along a predetermined path with respect to a workpiece, said apparatus comprising a set of templates including a plurality of individual templates of thin sheet form with each template having a respective character cutout through which the work tool is projected and guided in duplicating of the character on the workpiece, the characters in said set of templates having configurations such that there are at least two different lateral space requirements for respective ones of the characters in the forming thereof in side by side relationship along the predetermined path, and a template holder having a structural frame including a template supporting surface for support of a template thereon in predetermined relationship and a base portion positionable on a surface of a workpiece with said template supporting surface being in relatively spaced relationship to the workpiece surface, said template holder having spacing reference indicia provided for the different lateral spacings of respective template characters with said reference indicia providing orientation of the holder with respect to a preceding formed character and position referencing for a succeeding character to be formed.

2. A template apparatus according to claim 1 wherein said template holder includes center reference indicia for aligning of the holder with respect to a guide line related to the predetermined path along which a plurality of characters are to be formed in spaced relationship.

3. A template apparatus according to claim 2 wherein said template holder includes spacing reference indicia and center reference indicia for each of at least two different predetermined paths along which characters can be formed.

4. A template apparatus according to claim 1 wherein each of said templates includes selecting indicia indicating which of said spacing reference indicia is to be utilized with a respective template.

5. A template apparatus according to claim 4 wherein said spacing reference indicia includes a pair of such indicia for each different template spacing disposed in spaced apart relationship, and said selecting indicia indicating which of each such pair of indicia are to be utilized.

6. A template apparatus according to claim 1 wherein said template holder base portion carries said spacing reference indicia.

7. A template apparatus according to claim 6 wherein said base portion includes a flange adapted to be disposed in overlying relationship to a workpiece and has the spacing reference indicia formed thereon.

8. A template apparatus according to claim 7 wherein said flange is positionable in contacting engagement with the workpiece.

9. A template apparatus according to claim 1 wherein said template holder structural frame has an upstanding wall interconnecting with said base portion and said template supporting surface, said base portion including a flange projecting in laterally outward relationship and adapted to be disposed on a surface of a workpiece, said template supporting surface projecting in relatively inward relationship to said upstanding wall and defining a central open space over which a template is supported.

10. A template apparatus according to claim 9 wherein said flange extends completely around the periphery of said holder and said spacing reference indicia is formed on an upper surface of said flange.

11. A template apparatus according to claim 9 wherein said flange includes a straight edge portion on which said spacing reference indicia is formed, said indicia comprising lines terminating at a peripheral edge thereof.

12. A template apparatus according to claim 9 wherein said template holder flange includes a plurality of apertures formed therein in spaced apart relationship, said apertures being of a size to permit passage of nail-type fastening means therethrough for securing of said holder to a workpiece.

13. A template apparatus according to claim 1 wherein said template supporting surface includes securing means adapted to cooperate with a template in maintaining a template in assembled relationship with said template holder.

14. A template apparatus according to claim 13 wherein said template supporting surface comprises flange elements defining a central open space and an upwardly opening recess formed in said flange elements at their inner peripheral edges for receiving a template therein.

15. A template apparatus according to claim 14 wherein said recess is of the same depth as the thickness of said templates whereby said upper surface of a template positioned therein forms a smooth continuation of the upper surface of the flange elements.

16. A template apparatus according to claim 14 wherein said templates are formed with a predetermined peripheral edge configuration in specific relationship to the character and said recess is formed with a same configuration for receiving of said templates in a single orientation relative to said template holder.

17. A template apparatus according to claim 16 wherein said template edge configuration is trapezoidal and said recess is trapezoidal to mechanically interengage therewith and restrain a template against lateral displacement on the template supporting surface.

18. A template apparatus according to claim 16 wherein said template edge configuration includes at least two side portions in angularly disposed relationship.

19. A template apparatus according to claim 13 wherein said securing means is magnetic.

20. A template apparatus according to claim 19 wherein each of said templates is formed from a material which is attracted by a magnetic field and said template holder includes at least one magnetic device supported thereon in a position where its magnetic field will be in cooperating relationship to a template to retain the template in assembled relationship therewith.

21. A template apparatus according to claim 1 which includes guide means mechanically coupled with said template holder and operative to guide said holder along the predetermined path.

22. A template apparatus according to claim 21 wherein said guide means includes a guide bar selectively positionable in predetermined relationship to a workpiece and arm means secured to said template holder in laterally projecting relationship and interengageable with said guide bar in releasably secured relationship at a selected position.

23. A template apparatus according to claim 22 wherein said arm means includes a pair of arm elements releasably securable to said template holder in either of two angularly displaced positions.

24. A template apparatus according to claim 22 wherein said arm means includes clamp means for releasably engaging said guide bar.

* * * * *